United States Patent
Binstock (10) Patent No.: US 11,260,730 B2
(45) Date of Patent: Mar. 1, 2022

(54) WINDOWS FOR LOADER CAB

(71) Applicant: Clark Equipment Company, West Fargo, ND (US)

(72) Inventor: Mark W. Binstock, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 0 days.

(21) Appl. No.: 16/803,001

(22) Filed: Feb. 27, 2020

(65) Prior Publication Data

US 2020/0269662 A1    Aug. 27, 2020

Related U.S. Application Data

(60) Provisional application No. 62/811,118, filed on Feb. 27, 2019.

(51) Int. Cl.
| | |
|---|---|
| *B60J 1/18* | (2006.01) |
| *B60J 1/14* | (2006.01) |
| *B62D 33/06* | (2006.01) |
| *E05B 65/06* | (2006.01) |

(52) U.S. Cl.
CPC ............... *B60J 1/1876* (2013.01); *B60J 1/14* (2013.01); *B62D 33/0617* (2013.01); *E05B 65/06* (2013.01); *E05Y 2900/518* (2013.01); *E05Y 2900/55* (2013.01)

(58) Field of Classification Search
CPC ........ B60J 1/1876; B60J 1/14; B62D 33/0617
USPC .......................................... 296/146.16, 190.1
See application file for complete search history.

(56) References Cited

U.S. PATENT DOCUMENTS

| | | | | |
|---|---|---|---|---|
| 1,930,739 | A * | 10/1933 | Barnes ....................... | B60J 1/14 160/92 |
| 2,087,777 | A * | 7/1937 | Morrison ................... | B60J 1/14 49/371 |
| 2,583,918 | A * | 1/1952 | Wilson ............... | B62D 33/0617 296/102 |
| 2,817,281 | A * | 12/1957 | Schwan ..................... | B60J 7/08 454/189 |

(Continued)

FOREIGN PATENT DOCUMENTS

| | | |
|---|---|---|
| EP | 3 176 058 A1 | 6/2017 |
| JP | H09-3969 A | 1/1997 |

(Continued)

OTHER PUBLICATIONS

Invitation To Pay Additional Fees and, Where Applicable, Protest Fee for International Application No. PCT/US2020/020060, dated Jun. 5, 2020,11 pages.

(Continued)

*Primary Examiner* — D Glenn Dayoan
*Assistant Examiner* — Kevin P Weldon
(74) *Attorney, Agent, or Firm* — John Veldhuis-Kroeze; Westman, Champlin & Koehler, P.A.

(57) ABSTRACT

A cab for a power machine having a side window and a rear window each hingedly connected to the same one of a right rear cab frame post and a left rear cab frame post such that when the side window and rear window are both opened by latches to rotate outward relative to the same rear post an airflow path is created diagonally across the operator between a front corner of the cab and an opposite rear corner of the cab.

11 Claims, 5 Drawing Sheets

(56) References Cited

U.S. PATENT DOCUMENTS

| | | | | | |
|---|---|---|---|---|---|
| 4,619,479 | A | * | 10/1986 | Martin, Jr. | B66F 9/07545 |
| | | | | | 296/102 |
| 5,119,718 | A | * | 6/1992 | Wagner | B60H 1/00378 |
| | | | | | 296/208 |
| 5,791,727 | A | * | 8/1998 | Doescher | B60J 1/14 |
| | | | | | 296/146.16 |
| 7,938,479 | B2 | * | 5/2011 | Tuhy | E05D 7/121 |
| | | | | | 296/190.11 |
| 2008/0252102 | A1 | * | 10/2008 | Fukunaga | B62D 33/0617 |
| | | | | | 296/190.08 |
| 2010/0264695 | A1 | | 10/2010 | Hill et al. | |
| 2016/0090713 | A1 | | 3/2016 | Yamashita et al. | |
| 2017/0129306 | A1 | | 5/2017 | Komatsu | |

FOREIGN PATENT DOCUMENTS

| | | | | |
|---|---|---|---|---|
| JP | 2015-229904 A | | 12/2015 | |
| WO | WO-2012060293 A1 | * | 5/2012 | B62D 33/0617 |

OTHER PUBLICATIONS

Notification of Transmittal of the International Search Report and the Written Opinion of the International Searching Authority, or the Declaration for International Application No. PCT/US2020/020060, dated Jul. 24, 2020, 19 pages.

* cited by examiner

WINDOWS FOR LOADER CAB

CROSS-REFERENCE TO RELATED APPLICATION

This application claims the benefit of U.S. Provisional Application No. 62/811,118, which was filed on Feb. 27, 2019.

BACKGROUND

This disclosure is directed toward power machines. More particularly, this disclosure is directed to cabs for power machines and windows and window arrangements for such cabs.

Power machines, for the purposes of this disclosure, include any type of machine that generates power to accomplish a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Power machines having enclosed cab structures frequently have heating, ventilation, and air conditioning (HVAC) systems to control the environmental conditions within the cab. However, not all power machine cabs include HVAC systems. Further, even with an HVAC system, at times the ambient temperature outside of the cab is sufficiently comfortable for an operator and energy savings can be achieved by not running the HVAC system. Also, some operators may prefer fresh air to conditioned air from the HVAC system. It is desirable to provide an airflow path through the cab that allows air to flow over the operator. In cab structures with one-piece windows covering all or substantially all of a side of the cab, this can be a challenge.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter.

A cab for a power machine has a side window and a rear window each hingedly connected to the same one of a right rear cab frame post and a left rear cab frame post such that when the side window and rear window are both opened by latches to rotate outward relative to the same rear post an airflow path is created diagonally across the operator between a front corner of the cab and an opposite rear corner of the cab.

One general aspect includes a cab (350) for a power machine (100; 200), including: a frame (310) having a right front post (362), a left front post (364), a right rear post (366) and a left rear post (368); a side window (370) rotatably connected to the frame by a first hinge (374) proximal to one of the right and left rear posts; a rear window (372) rotatably connected to the frame by a second hinge (376) proximal to the same one of the right and left rear posts; where when the side window and the rear window are both opened by rotation relative to their respective first and second hinges, an airflow path (402) is created generally diagonally across an operator compartment between one of the right and left front posts and an opposite one of the right and left rear posts.

Implementations may include one or more of the following features. The cab where the frame (310) includes a canopy section (352) and one or more lower sections (354) and where the right front post, the left front post, the right rear post and the left rear post extend between the canopy section and the one or more lower sections. The cab and further including a door (382) positioned on a side opposite the side window. The cab and further including a front window (384) extending along at least a portion of the distance between the left front post and right front post. The cab and further including a first latch (378) engageable with the frame proximal one of the right and left front posts on a same side of the cab as the same one of the right and left rear posts to which the side window and rear window are connected by the first and second hinges, the first latch configured to open the side window by rotating the side window outward from the one of the right and left front posts. The cab and further including a second latch (380) engageable with the frame proximal to the other of the right and left rear posts opposite the same one of the right and left rear posts to which the side window and rear window are connected by the first and second hinges, the second latch configured to open the rear window by rotating the rear window rearward. The cab where the side window is connected by the first hinge to the cab structure proximal to the right rear post, and where the rear window is connected by the second hinge to the cab structure proximal to the right rear post.

One general aspect includes a power machine (100; 200), including: a machine frame (110; 210). The power machine also includes a power system (120; 220) supported by the machine frame and configured to provide power to operate functions of the power machine. The power machine also includes a work element (130; 230) supported by the machine frame and configured to perform a power machine work function using power provided by the power system; and a cab (350) supported by the machine frame, the cab defines an operator compartment and includes: a cab frame (310) having front side, left and right sides, and a rear side; a side window (370) connected to the cab frame on a first side of the cab selected from one of the left and right sides of the cab and moveable between a closed position and an open position, wherein in the open position, the side window allows movement of air through a side window aperture proximal to front side of the cab; a rear window (372) connected to the cab frame and moveable between a closed position and an open position, wherein in the open position, the side window allows movement of air through a rear window aperture proximal to a second side of the cab opposite the first side of the cab ; and where when the side window and the rear window are both opened an airflow path (402) is created generally diagonally across the operator compartment between the side window aperture and the rear window aperture.

Implementations may include one or more of the following features. The power machine and further including a door (382) on a side opposite the side window, and a front window (384) extending along the front side of the cab between the left and right sides. The power machine and further including a side window latch (378) engageable with the cab frame proximal the front side of the cab and configured to releasably secure the side window to the cab frame. The power machine and further including a rear window latch (380) engageable with the cab frame proximal the second side of the cab and configured to releasably secure the rear window to the cab frame.

DESCRIPTION

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments include power machine cabs having a side window and rear window hinged on a common rear frame post of the cab or to structure that is coupled to the rear frame post and latchable such that when both of the side window and rear window are opened, an airflow path between a front side corner and the opposite rear side corner is created. This allows airflow generally diagonally through the cab and across the operator.

Figure 2:
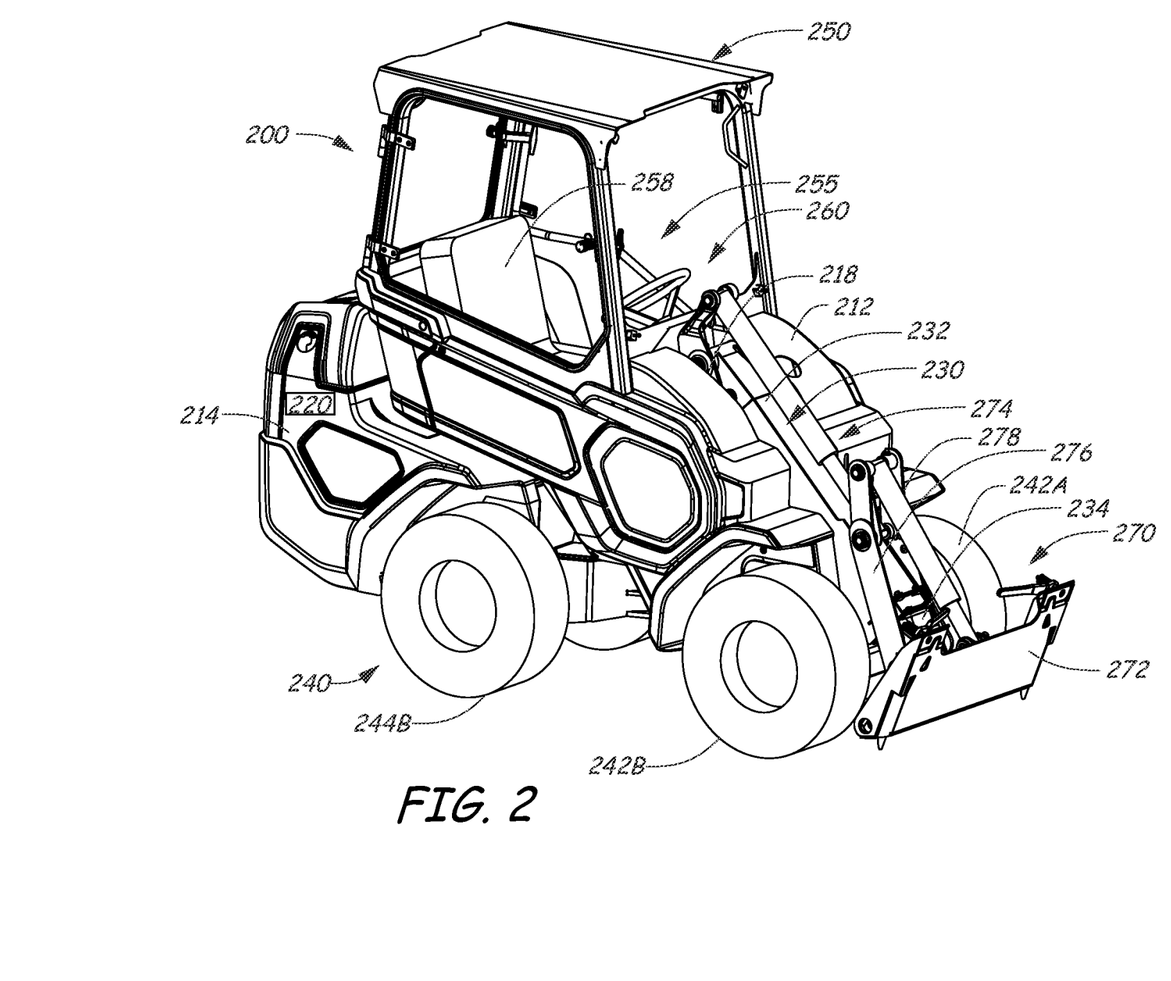
FIG. 2 is a perspective view showing generally a front of a power machine in the form of a small articulated loader on which embodiments disclosed in this specification can be advantageously practiced.
Figure 3:
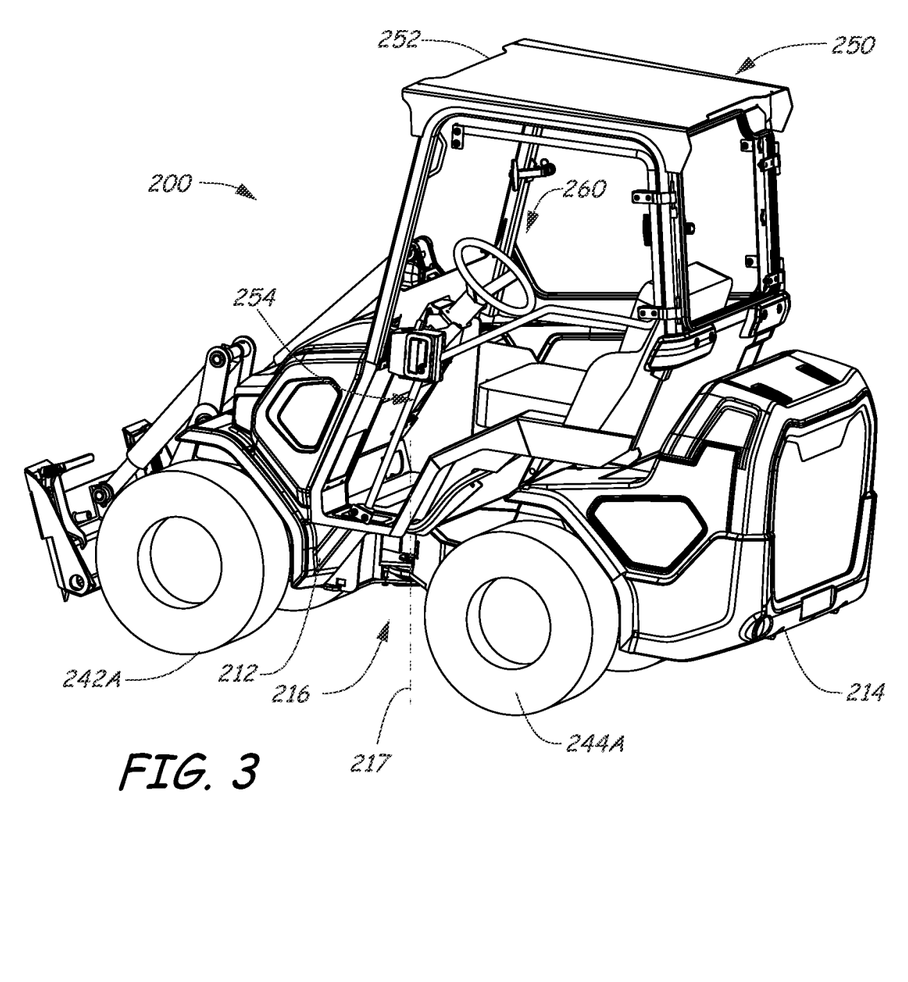
FIG. 3 is a perspective view showing generally a back of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
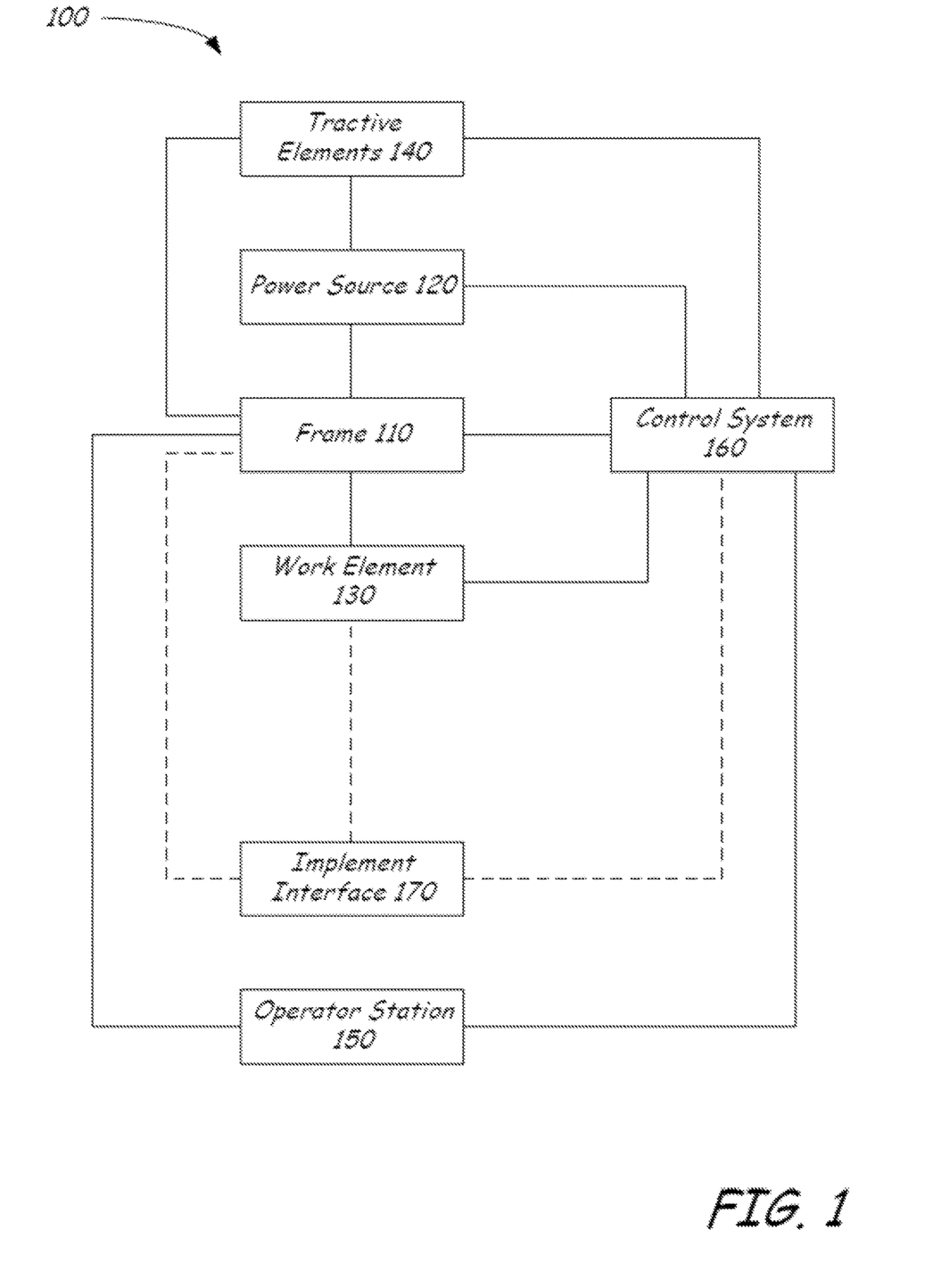
FIG. 1 is a block diagram illustrating functional systems of a representative power machine on which embodiments of the present disclosure can be advantageously practiced.

FIG. 1 is a block diagram illustrating the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. In some instances, the implement can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, the implement carrier is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which can provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab, which defines an operator compartment where an operator can be positioned to operate the machine. For the purposes of this discussion, an operator compartment means a defined space such as within a cab where an operator can be located during operation of the power machine. More particularly, an operator compartment is an enclosed or semi-enclosed space. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether they have operator compartments, operator positions or neither, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both the power machine and any implement to which is it coupled) that is capable of controlling at least some of the operator-controlled functions on the power machine.

FIGS. 2-3 illustrates a loader 200, which is one particular example of a power machine of the type illustrated in FIG. 1 where the embodiments discussed below can be advantageously employed. Loader 200 is an articulated loader with a front mounted lift arm assembly 230, which in this example is a telescopic lift arm. Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. The description herein of loader 200 with references to FIGS. 2-3 provides an illustration of the environment in which the embodiments discussed below and this description should not be considered limiting especially as to the description of features that loader 200 that are not essential to the disclosed embodiments. Such features may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that can generate or otherwise provide power for operating various functions on the power machine. Frame 210 also supports a work element in the form of lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270 that includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices to cause the power machine to perform various work functions. Cab 250 includes a canopy 252 that provides a roof for the operator compartment and is configured to have an entry 254 on one side of the seat (in the example shown in FIG. 3, the left side) to allow for an operator to enter and exit the cab. Although cab 250 as shown does not include any windows or doors, a door or windows can be provided.

The operator station 255 includes an operator seat 258 and the various operation input devices 260, including control levers that an operator can manipulate to control various machine functions. Operator input devices can include a steering wheel, buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive system 240, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interact with the embodiments discussed below can have various different frame components that support various work elements. The elements of frame 210 discussed herein are provided for illustrative purposes and should not be considered to be the only type of frame that a power machine on which the embodiments can be practiced can employ. As mentioned above, loader 200 is an articulated loader and as such has two frame members that are pivotally coupled together at an articulation joint. For the purposes of this document, frame 210 refers to the entire frame of the loader. Frame 210 of loader 200 includes a front frame member 212 and a rear frame member 214. The front and rear frame members 212, 214 are coupled together at an articulation joint 216. Actuators (not shown) are provided to rotate the front and rear frame members 212, 214 relative to each other about an axis 217 to accomplish a turn.

The front frame member 212 supports and is operably coupled to the lift arm 230 at joint 216. A lift arm cylinder (not shown, positioned beneath the lift arm 230) is coupled to the front frame member 212 and the lift arm 230 and is operable to raise and lower the lift arm under power. The front frame member 212 also supports front wheels 242A and 242B. Front wheels 242A and 242B are mounted to rigid axles (the axles do not pivot with respect to the front frame member 212). The cab 250 is also supported by the front frame member 212 so that when the front frame member 212 articulates with respect to the rear frame member 214, the cab 250 moves with the front frame member 212 so that it will swing out to either side relative to the rear frame member 214, depending on which way the loader 200 is being steered.

The rear frame member 214 supports various components of the power system 220 including an internal combustion engine. In addition, one or more hydraulic pumps are coupled to the engine and supported by the rear frame member 214. The hydraulic pumps are part of a power conversion system to convert power from the engine into a form that can be used by actuators (such as cylinders and drive motors) on the loader 200. Power system 220 is discussed in more detail below. In addition, rear wheels 244A and 244B are mounted to rigid axles that are in turn mounted to the rear frame member 214. When the loader 200 is pointed in a straight direction (i.e., the front frame portion 212 is aligned with the rear frame portion 214) a portion of the cab is positioned over the rear frame portion 214.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is a radial lift arm assembly, in that the lift arm is mounted to the frame 210 at one end of the lift arm assembly and pivots about the mounting joint 216 as it is raised and lowered. The lift arm assembly 230 is also a telescoping lift arm. The lift arm assembly includes a boom 232 that is pivotally mounted to the front frame member 212 at joint 216. A telescoping member 234 is slidably inserted into the boom 232 and telescoping cylinder (not shown) is coupled to the boom and the telescoping member and is operable to extend and retract the telescoping member under power. The telescoping member 234 is shown in FIGS. 2 and 3 in a fully retracted position. The implement interface 270 including implement carrier 272 and power couplers 274 are operably coupled to the telescoping member 234. An implement carrier mounting structure 276 is mounted to the telescoping member. The implement carrier 272 and the power couplers 274 are mounted to the positioning structure. A tilt cylinder 278 is pivotally mounted to both the implement carrier mounting structure 276 and the implement carrier 272 and is operable to rotate the implement carrier with respect to the implement carrier mounting structure under power. Among the operator controls 260 in the operator compartment 255 are operator controls to allow an operator to control the lift, telescoping, and tilt functions of the lift arm assembly 230.

Other lift arm assemblies can have different geometries and can be coupled to the frame of a loader in various ways to provide lift paths that differ from the radial path of lift arm assembly 230. For example, some lift paths on other loaders provide a radial lift path. Others have multiple lift arms coupled together to operate as a lift arm assembly. Still other lift arm assemblies do not have a telescoping member. Others have multiple segments. Unless specifically stated otherwise, none of the inventive concepts set forth in this discussion are limited by the type or number of lift arm assemblies that are coupled to a particular power machine.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as articulated loader 200, unless otherwise noted or recited, the concepts discussed below are not intended to be limited in their application to the environments specifically described above.

Figure 4:
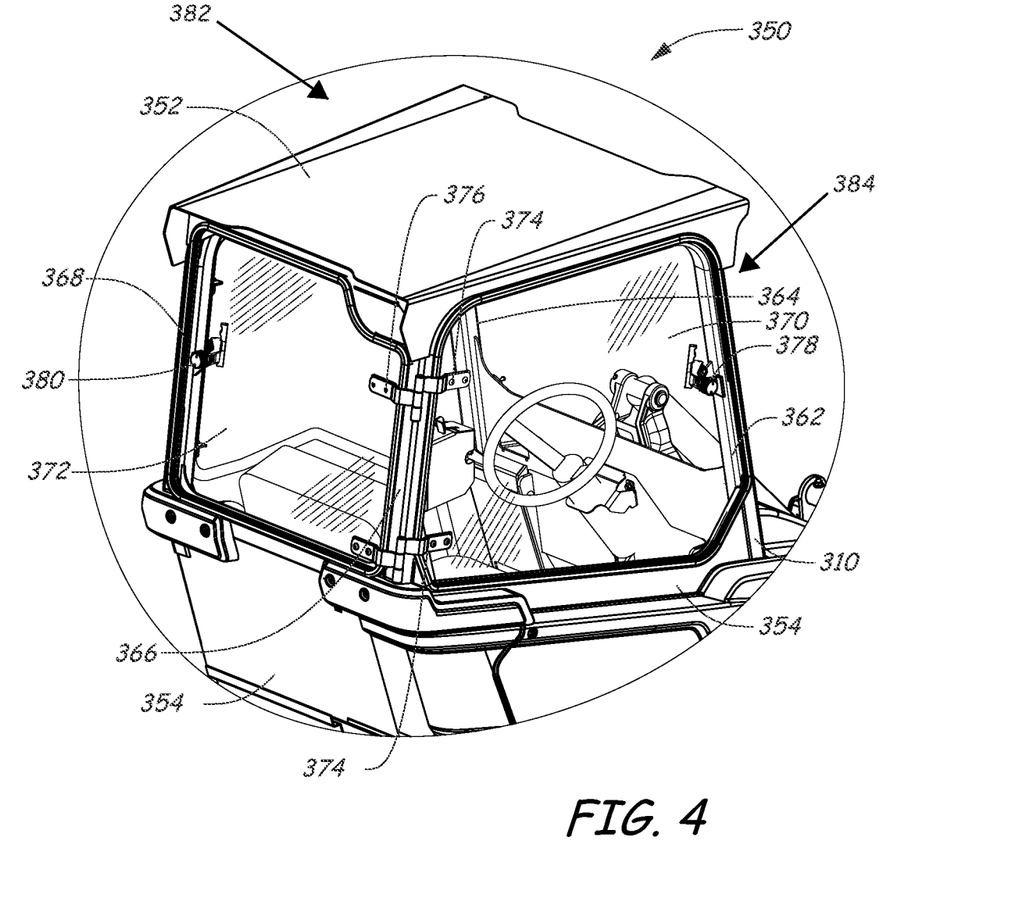
FIG. 4 is a perspective view of a cab similar to the cab shown in FIGS. 2-3 with windows according to one illustrative embodiment.

Referring now to FIG. 4, shown is a diagrammatic perspective view of a cab 350, which can be substantially similar to cab 250 of power machine 200 discussed above. Cab 350 includes a cab frame 310 having a top or canopy section 352, lower sections 354, and corner posts 362, 364, 366 and 368 extending between the canopy section 352 and the lower sections 354. As shown, corner posts 362 and 364 are positioned, respectively, at right and left front corners of the cab. Corner posts 366 and 368 are positioned, respectively, at right and left rear corners of the cab. On a right-hand side of the cab, window 370 is positioned in a window opening between canopy 352, a lower section 354, and right-side posts 362 and 366. A rear window 372 is positioned in a rear window opening between canopy 352, a lower section 354, and rear posts 366 and 368. A front window and a door on the opposite side are also included but not discussed in detail here.

In exemplary embodiments, right side window 370 is hinged to right rear post 366 using hinge mechanisms 374 to allow rotational movement of the window relative to the post. Rear window 372 is also hinged to right rear post 366 using hinge mechanisms 376 to allow some rotational movement of the window relative to the post. In some embodiments, the hinge mechanisms may not be attached directly to the post, but rather to structure that is coupled to the post. In other words, the hinges will be attached to cab structure proximal to the post, which can include the post itself. The relevant feature here is that windows are pivotally mounted to the cab in the same quadrant of the cab structure. Right side window 370 is openable using a latch mechanism 378 coupled to the right front post 362 to allow the right-side window to open outward by rotating relative to right rear post 366. Typically, the latch mechanism 378 is configured to limit the rotational movement of the right-side window 370, but other rotational limiting methods and structures can be used. Rear window 372 is openable using a similar latch mechanism 380 coupled to the left rear post 368 to allow the rear window to open rearward by also rotating relative to right rear post 366. In other embodiments, one or both of the side and rear windows can opened by means other than rotating on a hinge. For example, one or both windows can be slid between an open and closed position.

Figure 5:
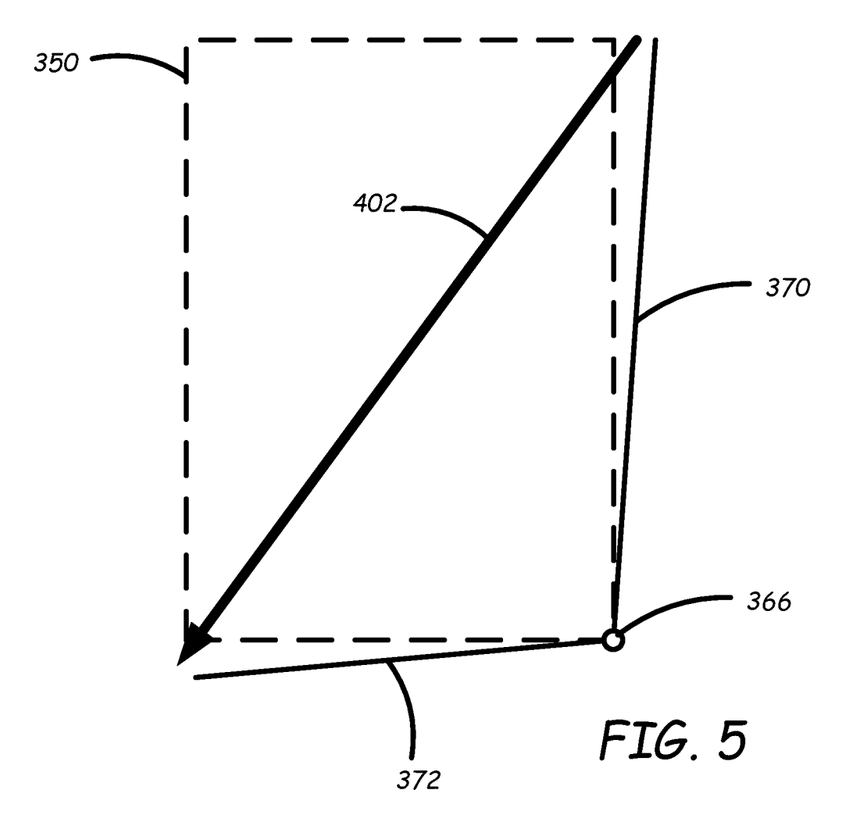
FIG. 5 is a diagrammatic illustration showing a simplified airflow path through the cab shown in FIG. 4.

As both of windows 370 and 372 are hinged to the same post 366, when both are in the open position, an airflow path is created between the right front corner of the cab and the left rear corner. This airflow path 402, shown diagrammatically in FIG. 5, passes generally diagonally through the cab 350 and across the operator. It must be noted that, while one diagonal airflow path is shown, in other embodiments a left-side window and the rear window can both be hinged to left rear post 368 to create a diagonal path from the left front corner of the cab to the right rear corner of the cab (for example on machines with a door on a right side).

The embodiments discussed above provide several important advantages. The diagonal path arrangement provides the airflow path where it is most useful to the operator for cooling the interior of the cab. With hinged windows that open only a small amount as controlled by the latch mechanisms, it can be difficult to achieve sufficient airflow through the cab. By utilizing a diagonal airflow path achieved through hinging both windows to the same rear post, the airflow path is optimized for the operator.

Although the present invention has been described with reference to preferred embodiments, workers skilled in the art will recognize that changes may be made in form and detail to the disclosed embodiments without departing from the spirit and scope of the concepts discussed herein.

What is claimed is:

1. A cab for a power machine, comprising:
a frame having a front side, left and right sides, and a rear side;
a side window connected to the frame on a first side of the cab and selected from one of the left and right sides of the cab and moveable between a closed position and an open position, wherein in the open position, the side window allows movement of air through a side window aperture between the frame and the side window and arranged on the first side of the cab proximal to the front side of the cab;
a rear window connected to the frame on the rear side of the cab and moveable between a closed position and an open position, wherein in the open position, the side window allows movement of air through a rear window aperture between the frame and the rear window and arranged on the rear side of the cab and proximal to a second side of the cab opposite the first side of the cab;
wherein when the side window and the rear window are both opened, an airflow path is created generally diagonally across the operator compartment between the side window aperture and the rear window aperture.

2. The cab of claim 1, wherein the frame includes a right front post, a left front post, a right rear post, a left rear post, a canopy section and one or more lower sections and wherein the right front post, the left front post, the right rear post and the left rear post extend between the canopy section and the one or more lower sections.

3. The cab of claim 1, and further comprising a door connected to the frame on the second side of the cab.

4. The cab of claim 3, and further comprising a front window connected to the frame and extending along the front side of the cab between the left and right sides.

5. The cab of claim 2, and further comprising a first latch engageable with the frame at the front side of the cab and configured to releasably secure the side window to the frame.

6. The cab of claim 5, and further comprising a second latch engageable with the frame at the second side of the cab and configured to releasably secure the rear window to the frame.

7. The cab of claim 1, wherein the side window is connected to the frame by a first hinge, and wherein the rear window is connected to the frame by a second hinge.

8. A power machine, comprising:
a machine frame;
a power system supported by the machine frame and configured to provide power to operate functions of the power machine;
a work element supported by the machine frame and configured to perform a power machine work function using power provided by the power system; and
a cab defining an operator compartment and supported by the machine frame, the cab comprising:
a cab frame having front side, left and right sides, and a rear side;
a side window connected to the cab frame on a first side of the cab selected from one of the left and right sides of the cab and moveable between a closed position and an open position, wherein in the open position, the side window allows movement of air through a side window aperture between the cab frame and the side window and arranged on the first side of the cab proximal to the front side of the cab;

a rear window connected to the cab frame on the rear side of the cab and moveable between a closed position and an open position, wherein in the open position, the side window allows movement of air through a rear window aperture between the cab frame and the rear window and arranged on the rear side of the cab and proximal to a second side of the cab opposite the first side of the cab; and wherein when the side window and the rear window are both opened, an airflow path is created generally diagonally across the operator compartment between the side window aperture and the rear window aperture.

9. The power machine of claim 8, and further comprising a door on the second side of the cab, and a front window extending along the front side of the cab between the left and right sides.

10. The power machine of claim 9, and further comprising a side window latch engageable with the cab frame at the front side of the cab and configured to releasably secure the side window to the cab frame.

11. The power machine of claim 10, and further comprising a rear window latch engageable with the cab frame at the second side of the cab and configured to releasably secure the rear window to the cab frame.

* * * * *